(12) United States Patent
Shintani et al.

(10) Patent No.: US 10,451,714 B2
(45) Date of Patent: Oct. 22, 2019

(54) OPTICAL MICROMESH FOR COMPUTERIZED DEVICES

(71) Applicants: Sony Corporation, Tokyo (JP); Sony Interactive Entertainment Inc., Tokyo (JP)

(72) Inventors: Peter Shintani, San Diego, CA (US); Jose Omar Gonzalez Hernandez, Chula Vista, CA (US); William Clay, San Diego, CA (US); Pablo Antonio Espinosa, San Diego, CA (US); Fred Ansfield, San Diego, CA (US); Bibhudendu Mohapatra, San Diego, CA (US); Keith Resch, San Diego, CA (US); Morio Usami, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/370,197

(22) Filed: Dec. 6, 2016

(65) Prior Publication Data

US 2018/0156900 A1    Jun. 7, 2018

(51) Int. Cl.
    *G01S 7/497* (2006.01)
    *G01S 17/08* (2006.01)
    (Continued)

(52) U.S. Cl.
    CPC .............. *G01S 7/497* (2013.01); *G01S 17/08* (2013.01); *G01S 17/87* (2013.01); *H04B 10/114* (2013.01); *G01S 7/484* (2013.01); *G01S 17/89* (2013.01)

(58) Field of Classification Search
    CPC .................................................... G01S 7/4911
    (Continued)

(56) References Cited

U.S. PATENT DOCUMENTS

| | | |
|---|---|---|
| 5,228,069 A | 7/1993 | Arenson et al. |
| 6,291,816 B1 | 9/2001 | Liu |

(Continued)

FOREIGN PATENT DOCUMENTS

| | | |
|---|---|---|
| EP | 2225699 A1 | 9/2010 |
| EP | 2730939 A2 | 5/2014 |
| EP | 2339532 B1 | 4/2015 |

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", file history of related U.S. Appl. No. 15/432,674, filed Feb. 14, 2017.

(Continued)

*Primary Examiner* — Ricky Ngon
(74) *Attorney, Agent, or Firm* — John L. Rogitz

(57) ABSTRACT

Multiple camera systems which use laser illumination for ranging benefit from a heartbeat to synchronize the timing of the individual lasers to eliminate collisions of multiple simultaneous laser emissions. An optical micromesh system provides for the dynamic entry and egress of mobile and stationary nodes. The optical communication between nodes may be controlled using time domain multiplexing (TDM) to avoid cross talk and communication collision due to overlapping laser illumination. By using an optical, laser based micromesh network, laser ranging can be used to dynamically map node location.

19 Claims, 6 Drawing Sheets

(51) Int. Cl.
*H04B 10/114* (2013.01)
*G01S 17/87* (2006.01)
*G01S 17/89* (2006.01)
*G01S 7/484* (2006.01)

(58) Field of Classification Search
USPC .......................................................... 702/89
See application file for complete search history.

(56) References Cited

U.S. PATENT DOCUMENTS

| | | | |
|---|---|---|---|
| 6,420,698 B1* | 7/2002 | Dimsdale | G01S 7/4811 |
| | | | 250/205 |
| 6,442,465 B2 | 8/2002 | Breed et al. | |
| 6,664,501 B1 | 12/2003 | Troitski | |
| 6,970,183 B1 | 11/2005 | Monroe | |
| 7,262,854 B2 | 8/2007 | Imura | |
| 7,752,483 B1 | 7/2010 | Muresan et al. | |
| 7,791,009 B2 | 9/2010 | Johnston et al. | |
| 8,730,309 B2 | 5/2014 | Wilson et al. | |
| 8,780,113 B1 | 7/2014 | Ciurea et al. | |
| 8,803,950 B2 | 8/2014 | Ren et al. | |
| 8,824,827 B2 | 9/2014 | Quan et al. | |
| 8,830,555 B2 | 9/2014 | Aksamit et al. | |
| 9,031,356 B2 | 5/2015 | Kunkel et al. | |
| 9,098,908 B2 | 8/2015 | Kirk et al. | |
| 9,214,492 B2 | 12/2015 | Tempel et al. | |
| 9,235,928 B2 | 1/2016 | Medioni et al. | |
| 9,262,691 B2 | 2/2016 | Kang et al. | |
| 9,275,302 B1 | 3/2016 | Yan et al. | |
| 9,286,694 B2 | 3/2016 | Kim et al. | |
| 9,319,139 B2* | 4/2016 | Effenberger | H04B 10/2581 |
| 9,405,008 B2 | 8/2016 | Raskar et al. | |
| 9,426,450 B1 | 8/2016 | Zhang et al. | |
| 9,435,891 B2 | 9/2016 | Oggier | |
| 9,483,835 B2 | 11/2016 | Liang et al. | |
| 9,542,749 B2 | 1/2017 | Freedman et al. | |
| 9,557,166 B2 | 1/2017 | Thuries et al. | |
| 9,618,613 B2 | 4/2017 | Murakami et al. | |
| 9,760,837 B1 | 9/2017 | Nowozin et al. | |
| 9,806,813 B2* | 10/2017 | Liu | H04B 10/2513 |
| 9,858,673 B2 | 1/2018 | Ciurea et al. | |
| 9,860,618 B2* | 1/2018 | Liu | H04Q 11/0067 |
| 9,995,578 B2 | 6/2018 | Ge et al. | |
| 10,142,612 B2 | 11/2018 | Ge et al. | |
| 2004/0141753 A1 | 7/2004 | Euw et al. | |
| 2004/0208272 A1 | 10/2004 | Moursund et al. | |
| 2005/0207755 A1* | 9/2005 | Rabbat | H04J 14/0227 |
| | | | 398/59 |
| 2005/0226214 A1* | 10/2005 | Keslassy | H04L 47/10 |
| | | | 370/351 |
| 2006/0221241 A1 | 10/2006 | Okumichi et al. | |
| 2006/0239558 A1 | 10/2006 | Rafii et al. | |
| 2007/0024614 A1 | 2/2007 | Tam et al. | |
| 2007/0279415 A1 | 12/2007 | Sullivan et al. | |
| 2008/0152247 A1 | 6/2008 | Oh et al. | |
| 2009/0080885 A1* | 3/2009 | Mehrotra | H04J 14/0227 |
| | | | 398/48 |
| 2009/0190853 A1 | 7/2009 | Noh | |
| 2010/0302365 A1 | 12/2010 | Finocchio et al. | |
| 2011/0188773 A1 | 8/2011 | Wei et al. | |
| 2011/0243570 A1* | 10/2011 | Kim | H04B 10/114 |
| | | | 398/140 |
| 2012/0032833 A1* | 2/2012 | Milligan | G01S 7/006 |
| | | | 342/59 |
| 2012/0044476 A1 | 2/2012 | Earhart et al. | |
| 2012/0056982 A1 | 3/2012 | Katz et al. | |
| 2012/0069009 A1 | 3/2012 | Shimoyama et al. | |
| 2012/0168605 A1 | 7/2012 | Milanovic et al. | |
| 2012/0182394 A1 | 7/2012 | Bae et al. | |
| 2012/0293615 A1 | 11/2012 | Chen et al. | |
| 2012/0306876 A1 | 12/2012 | Shotton et al. | |
| 2013/0051516 A1 | 2/2013 | Yang et al. | |
| 2013/0129224 A1 | 5/2013 | Katz et al. | |
| 2013/0195083 A1* | 8/2013 | Kim | H04W 72/0446 |
| | | | 370/336 |
| 2013/0207970 A1 | 8/2013 | Shpunt et al. | |
| 2013/0278604 A1 | 10/2013 | Georgis et al. | |
| 2013/0329012 A1 | 12/2013 | Bartos et al. | |
| 2014/0058367 A1 | 2/2014 | Dantus | |
| 2014/0079288 A1 | 3/2014 | Lee et al. | |
| 2014/0092221 A1 | 4/2014 | Nagai | |
| 2014/0168424 A1 | 6/2014 | Attar et al. | |
| 2014/0198977 A1 | 7/2014 | Narasimha et al. | |
| 2014/0226984 A1* | 8/2014 | Roberts | H04B 10/27 |
| | | | 398/66 |
| 2014/0240467 A1 | 8/2014 | Petyushko et al. | |
| 2014/0253679 A1 | 9/2014 | Guigues et al. | |
| 2014/0253691 A1 | 9/2014 | Holz | |
| 2014/0293993 A1* | 10/2014 | Ryhorchuk | H04L 67/12 |
| | | | 370/350 |
| 2014/0333728 A1 | 11/2014 | Navab et al. | |
| 2014/0355901 A1 | 12/2014 | Tezaur | |
| 2014/0375851 A1 | 12/2014 | Lee et al. | |
| 2014/0376768 A1 | 12/2014 | Troy et al. | |
| 2015/0002636 A1 | 1/2015 | Brown | |
| 2015/0022643 A1 | 1/2015 | Stetson et al. | |
| 2015/0024336 A1 | 1/2015 | Blassnig et al. | |
| 2015/0036926 A1 | 2/2015 | Choi et al. | |
| 2015/0070489 A1 | 3/2015 | Hudman et al. | |
| 2015/0130903 A1 | 5/2015 | Thompson et al. | |
| 2015/0130904 A1 | 5/2015 | Bae et al. | |
| 2015/0171968 A1* | 6/2015 | Featherston | H04B 10/1123 |
| | | | 398/118 |
| 2015/0248765 A1 | 9/2015 | Criminisi et al. | |
| 2015/0254811 A1 | 9/2015 | Sahu et al. | |
| 2015/0294686 A1 | 10/2015 | Autioniemi | |
| 2015/0309663 A1 | 10/2015 | Seo et al. | |
| 2015/0339471 A1 | 11/2015 | Bennett et al. | |
| 2015/0371393 A1 | 12/2015 | Ramachandra et al. | |
| 2015/0373322 A1 | 12/2015 | Goma et al. | |
| 2015/0378023 A1 | 12/2015 | Royo et al. | |
| 2016/0012633 A1 | 1/2016 | Wei et al. | |
| 2016/0097851 A1* | 4/2016 | Zhang | B64C 39/024 |
| | | | 342/22 |
| 2016/0098847 A1 | 4/2016 | Crnokrak | |
| 2016/0099777 A1* | 4/2016 | Liu | H04B 10/2513 |
| | | | 398/159 |
| 2016/0124089 A1 | 5/2016 | Meinherz et al. | |
| 2016/0173869 A1 | 6/2016 | Wang et al. | |
| 2016/0191759 A1 | 6/2016 | Somanath et al. | |
| 2016/0239725 A1 | 8/2016 | Liu et al. | |
| 2016/0328828 A1 | 11/2016 | Zhang et al. | |
| 2016/0344967 A1 | 11/2016 | Barnes et al. | |
| 2017/0061701 A1 | 3/2017 | Mittal et al. | |
| 2017/0188017 A1 | 6/2017 | Hall | |
| 2017/0372527 A1 | 12/2017 | Murali et al. | |
| 2018/0033357 A1 | 2/2018 | Li et al. | |
| 2018/0034579 A1* | 2/2018 | Liu | H04J 14/08 |
| 2018/0053284 A1 | 2/2018 | Rodriguez et al. | |
| 2018/0100928 A1 | 4/2018 | Keilaf et al. | |
| 2018/0124371 A1 | 5/2018 | Kamal et al. | |
| 2018/0173990 A1 | 6/2018 | Shintani et al. | |
| 2018/0176483 A1 | 6/2018 | Knorr et al. | |
| 2018/0190014 A1 | 7/2018 | Yarborough et al. | |

OTHER PUBLICATIONS

Riegler et al., "A Deep Primal-Dual Network for Guided Depth Super-Resolution", Institute for Computer Graphics and Vision, Graz University of TechnologyAustria, Jul. 28, 2016.

Schuon et al., "High-Quality Scanning Using Time-of-Flight Depth Superresolution", Stanford University, 2008.

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.

Peter Shintani, Morio Usami, Kazuyuki Shikama, Keith Resch, "Generating 3D Depth Map Using Parallax", file history of related U.S. Appl. No. 15/798,914, filed Oct. 31, 2017.

(56) References Cited

OTHER PUBLICATIONS

Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.
Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017.
Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.
Quang H. Nguyen, Minh N. Do, Sanjay J. Patel, "Depth image-based rendering from multiple cameras with 3D propagation algorithm", May 27, 2009.
Shuran Song, Jianxiong Xiao, "Sliding Shapes for 3D Object Detection in Depth Images", Abstract, Sep. 2014.
Yo-Sung Ho, Yun-Suk Kang, "Multi-View Depth Generation using Multi-Depth Camera System", Gwangju Institute of Science and Technology, Jan. 4, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", file history of related U.S. Appl. No. 15/383,392, filed Dec. 19, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", file history of related U.S. Appl. No. 15/383,683, filed Dec. 19, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Non-Final Office Action dated Apr. 19, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Non-Final Office Action filed Apr. 25, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Jun. 21, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jun. 27, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Jun. 15, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Jun. 20, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Non-Final Office Action dated Jul. 12, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicant's response to Non-Final Office Action filed Jul. 16, 2018.
Nathan Silberman, Rob Fergus, "Indoor Scene Segmentation using a Structured Light Sensor", Dept. of Computer Science, Nov. 6, 2011, Courant Institute, New York University, pp. 601-608.
Michael Taylor, Glenn Black, Javier Fernandez Rico, "Multipoint Slam Capture", file history of related U.S. Appl. No. 16/019,140, filed Jun. 26, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Final Office Action dated Nov. 19, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Final Office Action filed Dec. 6, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Dec. 27, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Non-Final Office Action dated Feb. 14, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Applicant's response to Non-Final Office Action filed Feb. 20, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Feb. 11, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Feb. 21, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Final Office Action filed Sep. 14, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018.
Jinbeum Jang, Sangwoo Park, Jieun Jo, Joonki Paik, "Depth map generation using a single image sensor with phase masks", Image Processing and Intelligent System Laboratory Graduate School of Advanced Imaging Science and Film, Chung-Ang University, Seoul, South Korea, Optical Society of America, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jan. 4, 2019.
Peter Shintani, Jose Omar Gonzalez Hernandez, William Clay, Pablo Antonio Espinosa, Fred Ansfield, Bibhudendu Mohapatra,

(56) References Cited

OTHER PUBLICATIONS

Keith Resch, Morio Usami, "Color Noise Reduction in 3D Depth Map", related U.S. Appl. No. 15/371,433, Non-Final Office Action dated Jan. 10, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Non-Final Office Action filed Jan. 17, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Final Office Action dated Apr. 2, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Final Office Action filed Apr. 15, 2019.
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Mar. 25, 2019.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Apr. 2, 2019.
He et al, "Iterative Transduction Learning for Automatic Image Segmentation and Matting with RGB-D Data", Elsevier, Mar. 2014.
Jang et al, "Depth Map Generation Using a Single Image Sensor with Phase Masks", Chang-Ang University, Seoul, South Korea, Jun. 2016.
Kim et al, "Multi-focusing and Depth Estimation Using a Color Shift Model-Based Computational Camera", IEEE Transactions on Image Processing, vol. 21, No. 9, Sep. 2012.
Li et al, "Brain-Inspired Framework for Fusion of Multiple Depth Cues", IEEE Transactions on Circuits and Systems for Video Technology, vol. 23, No. 7, Jul. 2013.
Roy et al, "Denoising 3D Models with Attributes Using Soft Thresholding", Bourgogne University, France, 2004.
Shintani et al, "Color Noise Reduction in 3D Depth Map", related U.S. Appl. No. 15/371,433, Non-Final Office Action dated Jun. 21, 2019.
Shintani et al, "Color Noise Reduction in 3D Depth Map", related U.S. Appl. No. 15/371,433, Non-Final Office Action response filed Jun. 28, 2019.
Shintani et al, "Using Micro Mirrors to Improve the Field of View of a 3D Depth Map", related U.S. Appl. No. 15/432,674, Final Office Action dated May 3, 2019.
Shintani et al, "Using Micro Mirrors to Improve the Field of View of a 3D Depth Map", related U.S. Appl. No. 15/432,674, Applicant's response to Final Office Action filed May 31, 2019.
Shintani et al, "Using Super Imposition to Render a 3D Depth Map", related U.S. Appl. No. 15/477,369, Applicant's Reply Brief filed May 29, 2019.
Shintani et al, "Using Super Imposition to Render a 3D Depth Map", related U.S. Appl. No. 15/477,369, Examiner's Answer dated May 13, 2019.

* cited by examiner

Establishing peer master (example)

Establishing peer master (example)

OPTICAL MICROMESH FOR COMPUTERIZED DEVICES

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, the use of such sensors by multiple devices can cause mutual interference due to overlapping emissions of laser illumination.

SUMMARY

As understood herein, multiple camera systems which use laser illumination for ranging benefit from a heartbeat to synchronize the timing of the individual lasers to eliminate collisions of multiple simultaneous laser emissions. An optical micromesh system provides for the dynamic entry and egress of mobile and stationary nodes. The optical communication between nodes may be controlled using time domain multiplexing (TDM) to avoid cross talk and communication collision due to overlapping laser illumination. By using an optical, laser based micromesh network, laser ranging can be used to dynamically map node location.

Preferably, a synchronous system includes plural devices each of which may be allocated a time slot, which can be achieved using a "heartbeat", i.e., a system clock.

Some camera systems rely upon specific forms of illumination so that ranging or 3D depth maps can be created. In the case that an active illumination system is used and the time of flight method is used, interference can occur which would otherwise reduce the performance of the depth mapping if there are multiple systems which have over lapping areas of illumination. As provided herein, to avoid this collision due overlapping illumination areas, the individual devices synchronize their respective emissions with each other so that no emission overlaps with any other. Each device can be allocated a slice of time using time division multiplexing (TDM). Alternatively, a system may be employed which divides the area into cells, akin to a cellphone system, and multiple non-overlapping cells may have an active illumination event, and still not have collisions.

Accordingly, in one aspect a device includes at least one computer medium that is not a transitory signal and that in turn includes instructions executable by at least one processor to access a transmission schedule, and to transmit laser range-finding beams according to the transmission schedule.

The device may include the processor. The device may further include at least one camera providing signals to the processor representative of reflections of the laser range-finding beams.

In example embodiments, the instructions are executable to synchronize at least one computer clock with a heartbeat signal in an optical micromesh that includes the device. The instructions may be executable to establish the device as a master device, in which case the instructions may also be executable to assign slots in the transmission schedule to other devices in an optical micromesh.

Or, the instructions can be executable to receive the transmission schedule from a master device. The device may be a first device in an optical micromesh and the master device can be a peer to the first device in the optical micromesh. Or, the master device may not be a peer to the first device in the optical micromesh and may instead be implemented by, for instance, a server. When the master is the device, the instructions may be executable to establish the device as the master device at least in part using time stamps of respective messages in an optical micromesh. Alternatively, the instructions may be executable to establish the device as a master device at least in part using device identifying information in respective messages in an optical micromesh.

In another aspect, an assembly includes plural computerized devices, each of which includes at least one laser emitter configured to output signals useful for generating images of other devices. The computerized devices are programmed with instructions to emit laser beams using time division and/or space division emission rules.

In another aspect, a method includes accessing a transmission schedule, and transmitting laser range-finding beams according to the transmission schedule.

The details of the present application, both as to its structure and operation, can be best understood in reference to the accompanying drawings, in which like reference numerals refer to like parts, and in which:

DETAILED DESCRIPTION

Figure 1:
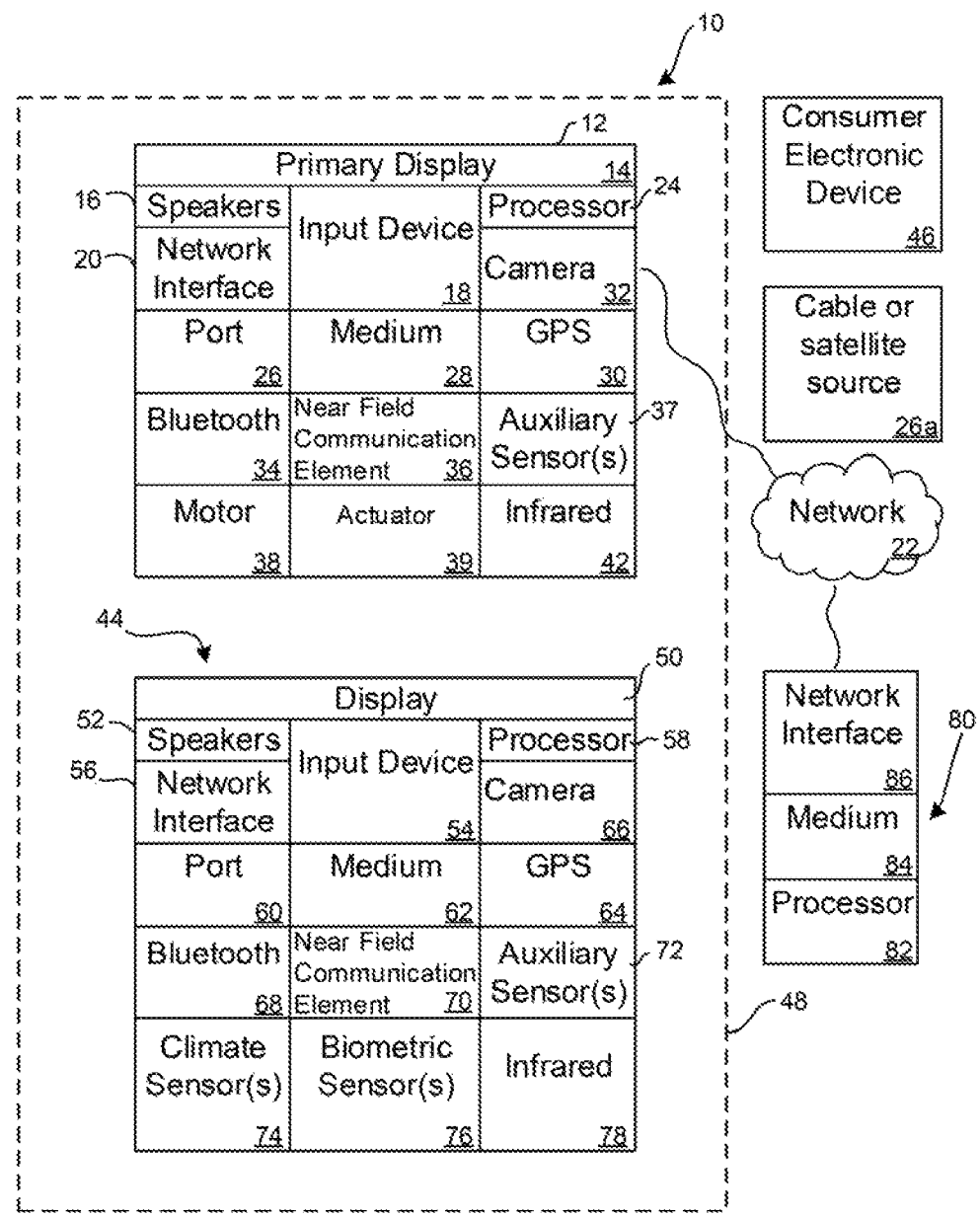
FIG. 1 is a block diagram of an example device.

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
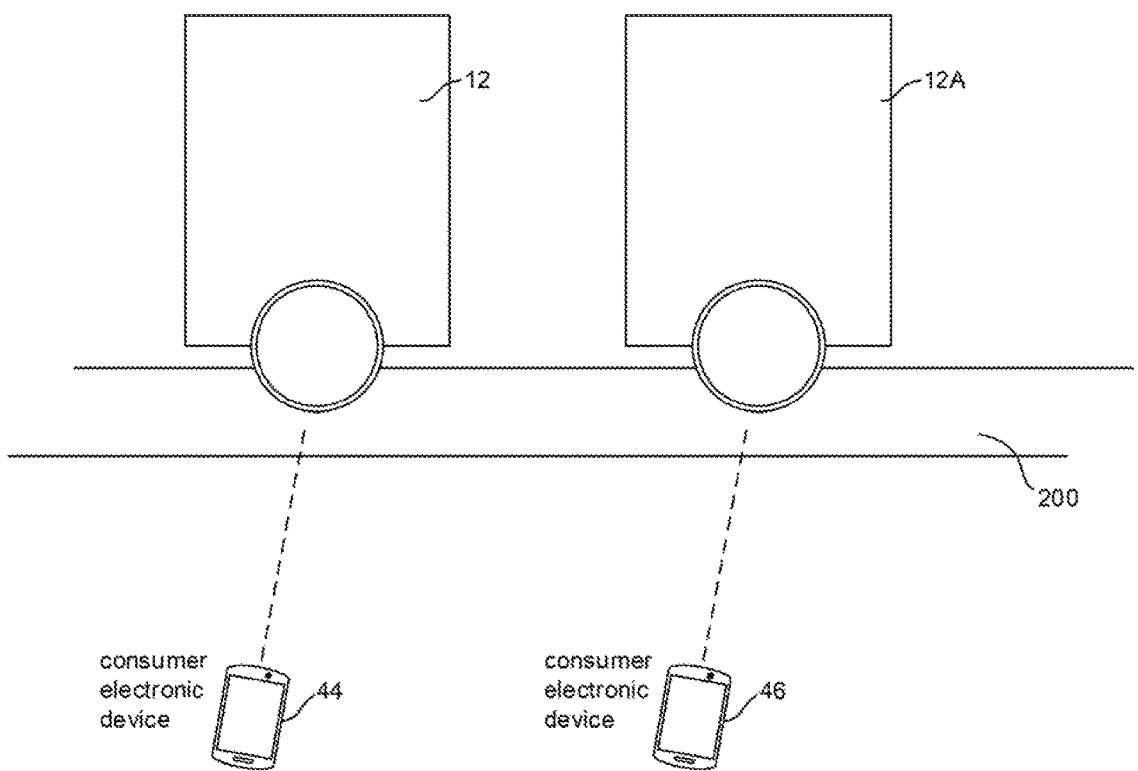
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
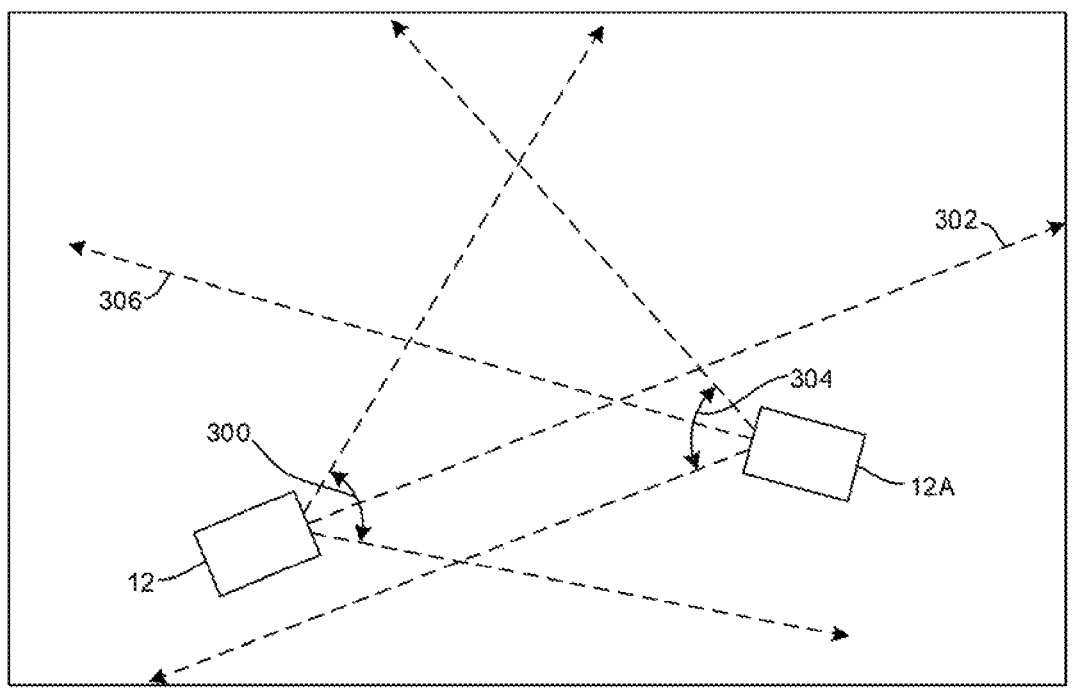
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
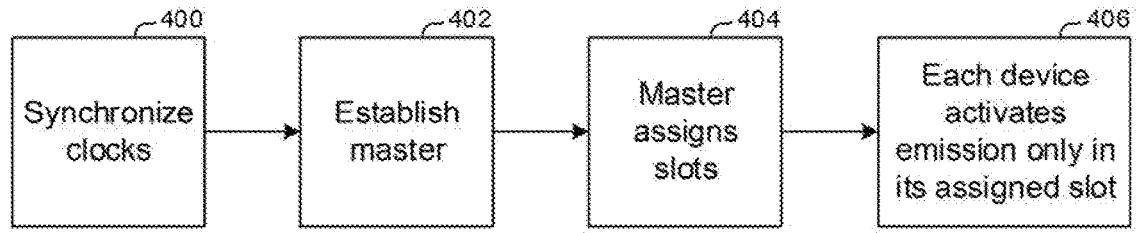
FIG. 4 is a flow chart of example general logic according to present principles.

FIG. 4 shows example general logic. Commencing at state 400, internal computer clocks of the devices 12, 12A are synchronized with each other. This can be done by synchronizing the clocks to a common "heartbeat" such as a master clock that may be the clock of any of the master devices discussed below, or other clock.

At block 402 a master device is established. Examples of how this may be done are discussed below. The master device may be a system server that communicates with the devices, or a controller such as the CE device 44, or one of the peer devices 12, 12A. The matter device may assign time slots in a transmission schedule to each device at block 404, and then each device activates its emission (such as a laser range-finding emission) at block 406 only in a period defined by one of its assigned slots in the schedule.

Figure 5:
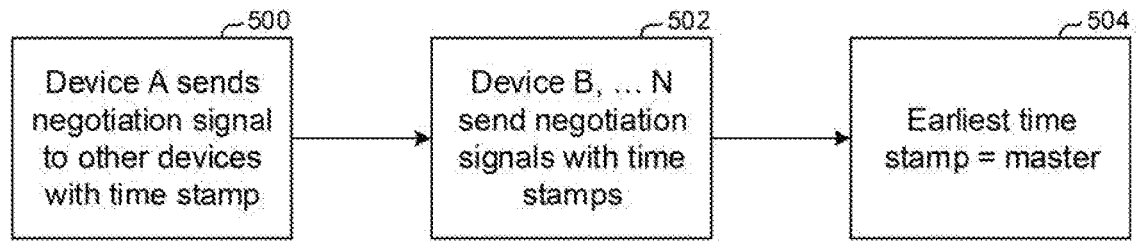
FIG. 5 is a flow chart of example logic for establishing a peer device as a master device.

FIG. 5 illustrates example logic when one of the peer devices 12, 12A is to be a master. A first one of the devices ("A") sends a negotiation signal at block 500 to the other devices, time-stamping the transmission time in a "let's establish a master" message carried in the signal. The signal may be sent via Wi-Fi, Bluetooth, laser, or other transmission means. Other devices ("B", . . . N") may also send time-stamped negotiation signals at block 502. At block 504, the devices access the timestamps of their messages and the messages of the other devices, and the device whose message carries the earliest time stamp can be acknowledged, by each device, as the master device at block 504.

Figure 6:
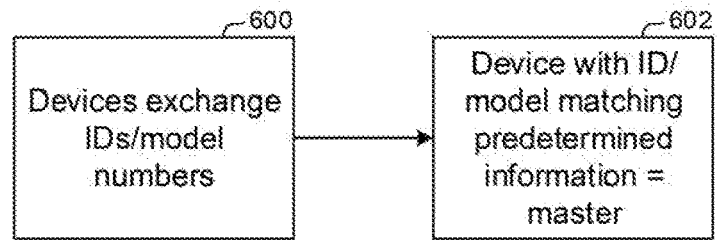
FIG. 6 is a flow chart of example alternate logic for establishing a peer device as a master device.

Alternatively, at block 600 in FIG. 6 each device 12, 12A . . . can send identification information such serial number and/or model number and/or manufacturer name to other devices. At block 602 the device with its identification information matching a predetermined information can be acknowledged, by each device, as the master device.

Figure 7:
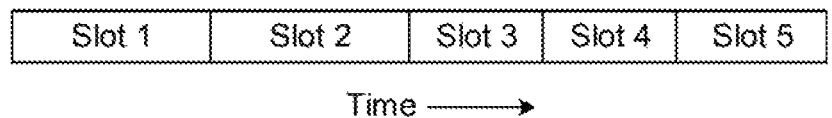
FIG. 7 is a schematic diagram of an example transmission schedule.

FIG. 7 shows an example transmission schedule that is divided into sequential time slots each of which may have the same temporal length as the other slots, or a different length than the other slots. These slots can be assigned to respective devices at block 404 in FIG. 4 by the master device. It is to be understood that the transmission schedule may start at an initial time defined by the system "heartbeat" and that the time slots repeat, so that each device is typically assigned multiple time slots separated from each other by the time slots of the other devices.

Figure 8:
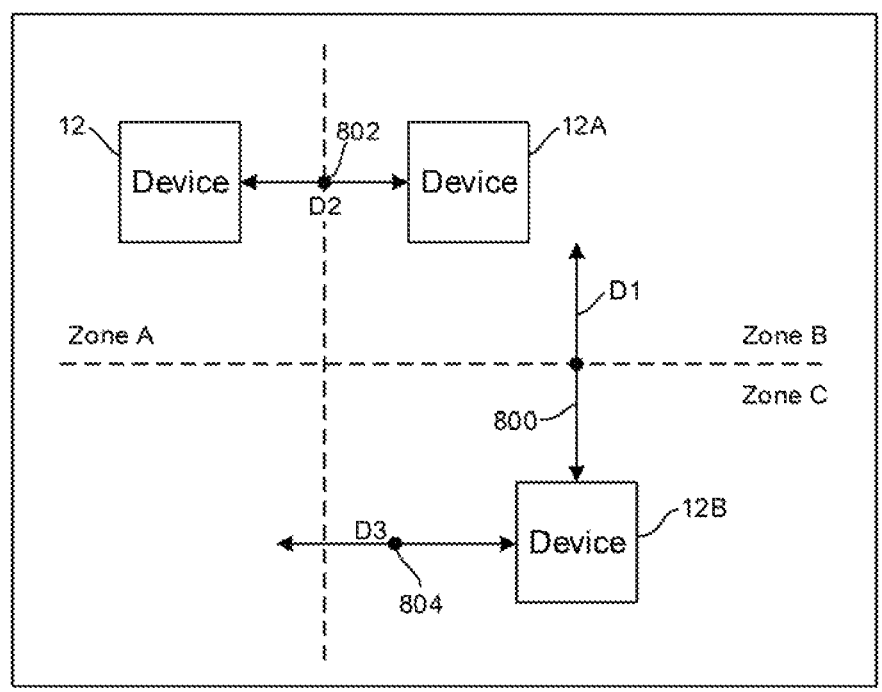
FIG. 8 is an example schematic plan view of multiple devices illustrating a space division interference-avoidance technique.

FIG. 8 illustrates that in lieu of (or in addition to) using time division multiplexing (TDM) as in FIGS. 4-7 to alleviate mutual interference due to overlapping emissions of laser illumination, space division (SD) may be used to alleviate mutual interference. In FIG. 8, as an example, three devices 12, 12A, and 12B are assigned respective spatial zones A, B, and C. The zones may be static, with the devices 12, 12A, and 12B being restricted to remaining within their zones. Or, the zones may be dynamic and may change as the devices move, e.g., on a common flat surface. As an example of the latter, suppose the distance along the y-axis between the devices 12A and 12B is D1, with the midpoint being at 800. A horizontal boundary represented by the dashed line may be established by a perpendicular to the distance vector that passes through the midpoint 800.

Similarly, if the distance D2 along the x-axis between the devices 12 and 12A is D2 with midpoint 802, a vertical boundary represented by the dashed line may be established by a perpendicular to the distance vector that passes through the midpoint 802. The zones A, B, and C are defined by the boundaries. Because the distance D3 along the x-axis between the devices 12 and 12B is greater than the distance D2 between the devices 12 and 12A, its midpoint 804 is not used to define a boundary. In other implementations the midpoint of the greater distance may be used. Other points along the distance vector than the midpoint may be used. In any case, it will be appreciated that as a device moves, the boundaries defining the zones may also move and, hence, the sizes of the zones can change dynamically.

Figure 9:
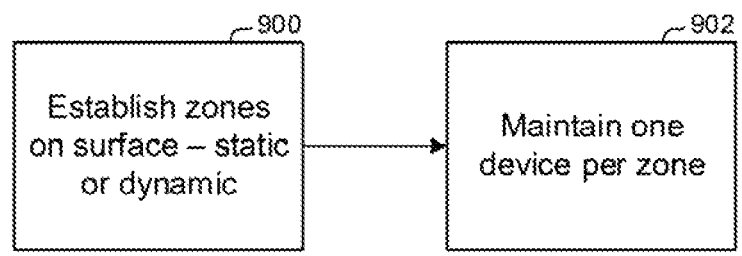
FIG. 9 is a flow chart of example logic attendant to the technique in FIG. 8.

FIG. 9 illustrates to block 900 that the zones shown in FIG. 8 are established and remain static or change dynamically as disclosed. The zones may be established by, e.g., a master device such as any of the above-described master devices. At block 902 when the devices can move, each device is constrained to remain within its assigned spatial zone.

While particular techniques and machines are herein shown and described in detail, it is to be understood that the subject matter which is encompassed by the present invention is limited only by the claims.

What is claimed is:

1. A device comprising:
   at least one computer medium that is not a transitory signal and that comprises instructions executable by at least one processor to:
   access a transmission schedule;
   transmit laser range-finding beams according to the transmission schedule to determine at least one range to at least one object using reflections of the laser range-finding beams; and
   synchronize at least one computer clock with a signal in an optical micromesh that includes the device.

2. The device of claim 1, comprising the at least one processor.

3. The device of claim 2, comprising at least one camera providing signals to the at least one processor representative of reflections of the laser range-finding beams.

4. The device of claim 1, wherein the instructions are executable to establish the device as a master device that assigns slots in the transmission schedule to other devices to transmit range-finding beams.

5. The method of claim 4, wherein the signal is a heartbeat signal and the mesh network comprises an optical micromesh.

6. The device of claim 1, wherein the instructions are executable to receive the transmission schedule from a master device.

7. A device comprising:
   at least one computer medium that is not a transitory signal and that comprises instructions executable by at least one processor to:
   transmit laser range-finding beams to determine at least one range to at least one object using times of flight of the beams; and
   assign slots in a transmission schedule to other devices in an optical micromesh so that the other devices transmit range-finding beams during respective slots in the transmission schedule.

8. A device comprising:
   at least one computer medium that is not a transitory signal and that comprises instructions executable by at least one processor to:
   access a transmission schedule having an association with a master device;
   transmit laser range-finding beams according to the transmission schedule to determine at least one range to at least one object using time of flight of at least one beam, wherein the device is a first device in an optical micromesh and the master device is a peer to the first device in the optical micromesh.

9. A device comprising:
   at least one computer medium that is not a transitory signal and that comprises instructions executable by at least one processor to:
   access a transmission schedule having an association with a master device;
   transmit laser range-finding beams according to the transmission schedule to determine at least one range to at least one object, wherein the device is a first device in an optical micromesh and the master device is a not a peer to the first device in the optical micromesh.

10. A device comprising:
    at least one computer medium that is not a transitory signal and that comprises instructions executable by at least one processor to:
    access a transmission schedule;
    transmit laser range-finding beams according to the transmission schedule to determine at least one range to at least one object; and
    establish the device as a master device at least in part using time stamps of respective messages in an optical micromesh.

11. A device comprising:
    at least one computer medium that is not a transitory signal and that comprises instructions executable by at least one processor to:
    access a transmission schedule;
    transmit laser range-finding beams according to the transmission schedule to determine at least one range to at least one object; and
    establish the device as a master device at least in part using device identifying information in respective messages in an optical micromesh.

12. An assembly comprising:
    plural computerized devices;
    each computerized device comprising at least one laser emitter configured to output signals useful for generating images of other devices;
    the computerized devices being programmed with instructions to emit laser beams using time division and/or space division emission rules wherein a peer device or a non-peer device in a micromesh of the plural computerized devices is established as a master device to coordinate laser beam emission.

13. The assembly of claim 12, wherein the devices are programmed with instructions to emit laser beams using time division emission rules.

14. The assembly of claim 12, wherein the devices are programmed with instructions to emit laser beams using space division emission rules.

15. A method comprising:
    accessing a transmission schedule;
    transmitting laser range-finding beams according to the transmission schedule to determine ranges to devices using times of flights of the beams; and
    synchronizing at least one computer clock with a signal in a mesh network.

16. The method of claim 15, comprising providing signals to at least one processor representative of reflections of the laser range-finding beams.

17. A method comprising:
    accessing a transmission schedule;
    transmitting laser range-finding beams according to the transmission schedule; and
    establishing a peer device in a micromesh of devices as a master device to implement the transmission schedule.

18. A method comprising:
    accessing a transmission schedule;
    transmitting laser range-finding beams according to the transmission schedule; and
    establishing a non-peer device as a master device to implement the transmission schedule.

19. A method comprising:
accessing a transmission schedule;
transmitting laser range-finding beams according to the transmission schedule to determine ranges to devices using times of flight of the beams;
wherein the transmission schedule includes time slots assigned to respective devices in an optical micromesh for defining when the devices transmit the laser range finding beams.

* * * * *